Oct. 17, 1939.  R. J. GORMAN ET AL  2,176,378
AUTOMOBILE DIRECTION INDICATOR
Filed Nov. 9, 1937
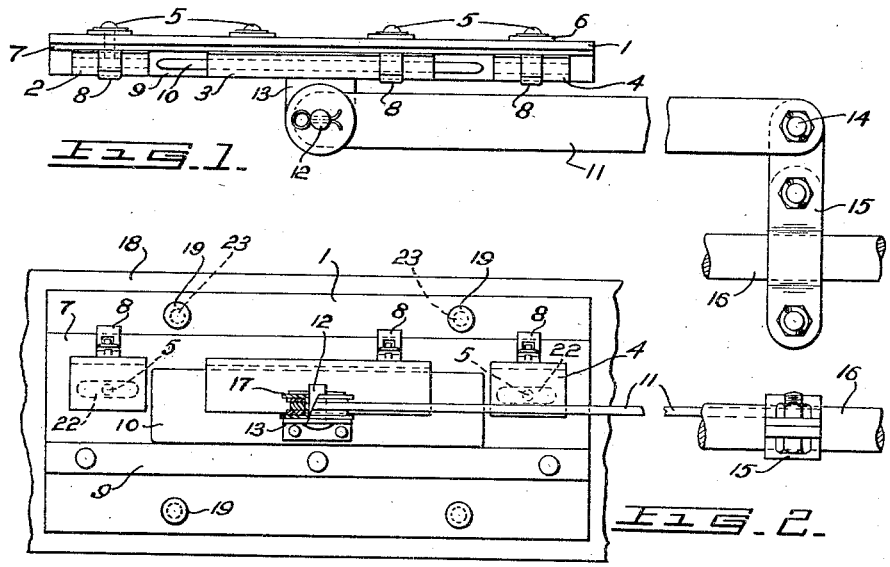
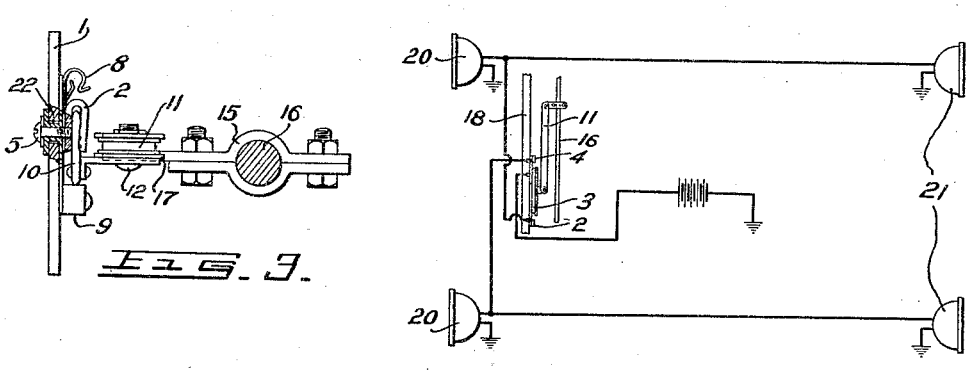
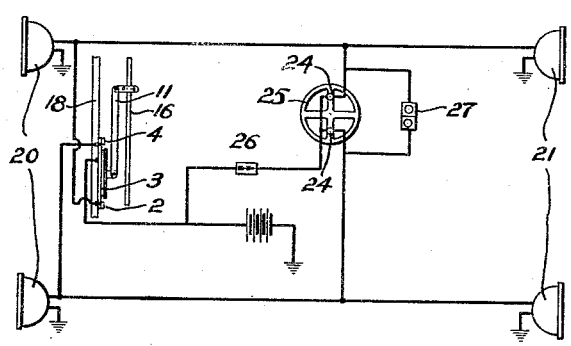
INVENTOR:
RICHARD J. GORMAN and WM. JOHN McININCH
BY Alex. E. MacRae
ATTORNEY.

Patented Oct. 17, 1939

2,176,378

UNITED STATES PATENT OFFICE 2,176,378

AUTOMOBILE DIRECTION INDICATOR

Richard Joseph Gorman and William John McIninch, Ottawa, Ontario, Canada

Application November 9, 1937, Serial No. 173,580

1 Claim. (Cl. 200—59)

This invention relates to automobile direction indicating devices of the type comprising a switch having three stationary contacts adapted to be mounted on the front axle of the automobile and a movable contact operated by the automobile steering gear so as to cause automatic illumination of a lamp or lamps on the side of the automobile to which it is being steered.

Various devices of this type have been proposed which are open to practical objections and disadvantages, the most important of which include their complicated structures, their susceptibility to injury by vibration and untoward movements of various parts of the automobile on which they are mounted and their consequent failure in operation. It is the object of the present invention to provide a device of simple and inexpensive construction which is free from such objections and disadvantages.

Referring now to the accompanying drawing which illustrates by way of example one convenient embodiment of the invention.

Figure 1 is a plan,

Figure 2 is an elevation, partially in section,

Figure 3 is a side elevation, partially in section and

Figure 4 is a diagram showing the electrical connections between the invention and the signal lamps of an automobile, Figure 5 is a diagrammatic view showing an alternative arrangement embodying a manual control.

The invention comprises a stout base plate 1 of an insulating material such as hard fiber, or of metal, to which three stationary contacts 2, 3 and 4 are secured by means of screws 5. The screws 5 are insulated from the base plate if the latter is metal by means of insulation 6 (Figure 3) and the contacts 2, 3 and 4 by means of a strip of insulation 7. A suitable terminal or wire connecting means is connected to each of the contacts 2, 3 and 4, clips 8 being shown in the illustrated example. The contacts 2, 3 and 4 are preferably of inverted U-shaped form in cross section and may be made of brass and bevelled or rounded at the inside edges. A strip of insulating material 9, such as hard fiber, forms a ledge on which is supported a flat or knife contact 10 which is slidably mounted so as to be constantly in contact with the walls of the stationary contact 3.

The movable contact 10 is provided with means for mechanically connecting it to the cross bar of the steering mechanism of an automobile. This means is illustrated as comprising a bar 11 pivotally connected at one end by a pin 12 to a bracket 13 riveted to or integral with the movable contact 10, and pivotally connected at the other end by a bolt 14 to a clamp 15 adapted to embrace a steering gear cross bar 16. If, as is usual, the one side of the automobile circuit is grounded to the automobile frame, the bracket 13 is insulated from the bar 11 by means of insulating material 17.

The device is secured to the rear of the front axle 18 of the automobile by bolts 19, holes 23 being provided in the base plate 1 to receive the bolts.

The normal position of the movable contact 10 is shown in Figure 2, in which this contact is in contact only with the central stationary contact 3. As soon as the steering gear is operated to change the direction of travel of the automobile, the cross bar 16 moves in the opposite direction and causes a sliding movement of contact 10. One end of the contact 10 enters between the walls of contact 2 or 4 according to the direction of movement of the cross bar 16. From the circuit illustrated in Figure 4 it will be seen that, when steering the automobile to the right, the bar 16 will move to the left, and cause contact 10 to slide into contact 2, whereupon right hand front signal lamp 20 and a right hand rear signal lamp 21 will be lighted. Steering the automobile to the left will cause right hand movement of bars 16 and 11 and consequently the contact 10 will slide into the contact 4 and cause lighting of left hand front signal lamp 20 and left hand rear lamp 21.

The screws 5 pass through slots 22 in the plate 1 so that the contacts 2 and 4 can be readily adjusted to suit the requirements of different automobiles.

If desired, a manual control, such as is illustrated in Figure 5, may be embodied in the invention. As shown, two spring push button switches 24 are mounted on the steering wheel 25 and are connected in the respective right and left hand signal lamp circuits. These switches may be operated independently of the steering wheel movement and automatic switch operated thereby to indicate an intention to make a right or left turn.

If, for any reason such as for instance, in parking, it is desired to cut out the automatic switch, means may be provided for so doing. As shown in Figure 5, this means comprises a cut-off switch 26 provided in the circuit. The switch may be conveniently positioned in the driver's compartment of the automobile.

Means may be provided for indicating to the driver whether or not the signal lamps are in closed circuit. This means, as shown in Figure 5, comprises a pair of pilot lights 27 connected respectively to the right and left signal lamp circuits whereby as each circuit is closed the corresponding pilot lamp becomes lighted. The pilot lamps may conveniently be positioned on the steering post.

Positioning of the automatic switch entirely at the rear of the front axle with no upwardly or downwardly projecting parts ensures prevention of contact thereof with other parts of the automobile during any excessive movements of the axle as, for instance, in travelling over rough obstructions and the like in roads, and does not alter the road clearance of the vehicle.

The device is not susceptible to injury by vibration since the movable contact 10 is always retained in proper position with respect to the stationary contacts 2, 3 and 4 by means of the supporting strip 9 and the U-shaped nature of the stationary contacts. Moreover, the U-shaped nature of the latter contacts ensures a good connection between the same and the movable contact and the strip 9 provides an even bearing surface for the contact 10 at all times.

It will be observed that the device has substantially no relatively movable parts with the exception of the sliding contact 10 and the fiber strip 9, between which there is practically no wear.

The device is applicable to all types of motor-driven vehicles without alterations in structure or size. While vehicles vary widely in the distance between the tie rod and the axle, it will be observed that, due to the provision of the link 11, the device may accommodate itself to varying distances of large extent. Moreover the arrangement of a sliding contact with the stationary contacts in a straight line permits use of the switch described in substantially all types of motor-driven vehicles without alteration. Thus, elimination of swinging contacts and like features in types of known arrangements is an important feature in the universal application of the device.

We claim:

In an automobile having a steering gear cross bar, a direction indicating device comprising a base plate, three inverted U-shaped stationary contacts arranged in a straight line and spaced apart, screws removably connecting said contacts to the plate, said plate having slots therein through which said screws pass to permit adjustment of said contacts, a flat movable contact slidably mounted between the walls of the central stationary contact, a strip of insulating material secured to the plate and presenting a surface on which said slidable contact is adapted to slide, and a mechanical linkage connecting said movable contact with said cross bar.

RICHARD JOSEPH GORMAN.
WILLIAM JOHN McININCH.